(12) United States Patent
Wieckhorst et al.

(10) Patent No.: US 10,433,473 B2
(45) Date of Patent: Oct. 8, 2019

(54) METHOD AND SYSTEM FOR DETERMINING AN OPERATING POINT OF AN AGRICULTURAL VEHICLE

(71) Applicant: CLAAS Tractor SAS, Vélizy-Villacoublay (FR)

(72) Inventors: Jan Carsten Wieckhorst, Paderborn (DE); Christian Ehlert, Bielefeld (DE)

(73) Assignee: CLAAS Tractor SAS, Vélizy-Villacoublay (FR)

(*) Notice: Subject to any disclaimer, the term of this patent is extended or adjusted under 35 U.S.C. 154(b) by 51 days.

(21) Appl. No.: 15/709,860

(22) Filed: Sep. 20, 2017

(65) Prior Publication Data
US 2018/0084709 A1 Mar. 29, 2018

(30) Foreign Application Priority Data

Sep. 28, 2016 (DE) .................. 10 2016 118 297

(51) Int. Cl.
*A01B 69/00* (2006.01)
*A01B 79/00* (2006.01)
(Continued)

(52) U.S. Cl.
CPC ............ *A01B 69/007* (2013.01); *A01B 63/00* (2013.01); *A01B 63/112* (2013.01); *A01B 79/005* (2013.01); *G05D 2201/0201* (2013.01)

(58) Field of Classification Search
CPC ..... A01B 69/007; A01B 63/112; A01B 63/00; A01B 79/005; G05D 2201/0201
(Continued)

(56) References Cited

U.S. PATENT DOCUMENTS

2014/0156152 A1* 6/2014 Faivre ............... G05D 1/00
701/50
2014/0156153 A1* 6/2014 Faivre ............... G07C 5/0841
701/50
(Continued)

FOREIGN PATENT DOCUMENTS

DE  10 2013 106548 A1  12/2014
JP     2000 316313 A    11/2000
(Continued)

OTHER PUBLICATIONS

European Search Report for related EP Application No. 17185536.4, dated Feb. 13, 2018, 8 pgs.

*Primary Examiner* — Brian P Sweeney
(74) *Attorney, Agent, or Firm* — Lempia Summerfield Katz LLC (57) ABSTRACT

A method and system for determining an operating point of an agricultural vehicle is disclosed. The agricultural vehicle includes a ground engaging device for supporting the vehicle on the ground, a propulsion engine for driving the ground engaging device, sensors for generating sensor signals, and an evaluation unit. An input parameter is entered into the evaluation unit. The evaluation unit accesses a characteristic diagram for operating parameters of the agricultural vehicle (either by generating the characteristic diagram or accessing a previously stored characteristic diagram). The evaluation unit then determines the optimal operating point of the agricultural vehicle based on the characteristic diagram. The evaluation unit determines a current operating point based on acquired vehicle parameters, and compares the current operating point with the optimal operating point. Based on the comparison, the evaluation unit may determine the operating point of the agricultural vehicle.

21 Claims, 3 Drawing Sheets

(51) Int. Cl.
*A01B 63/00* (2006.01)
*A01B 63/112* (2006.01)

(58) Field of Classification Search
USPC .......................................................... 701/50
See application file for complete search history.

(56) References Cited

U.S. PATENT DOCUMENTS

2014/0343802 A1 11/2014 Pichlmaier
2017/0291650 A1 10/2017 Buchner et al.

FOREIGN PATENT DOCUMENTS

WO     WO 2013/013917 A1    1/2013
WO     WO 2016/045868 A1    3/2016

* cited by examiner

Fig. 3B

METHOD AND SYSTEM FOR DETERMINING AN OPERATING POINT OF AN AGRICULTURAL VEHICLE

CROSS REFERENCE TO RELATED APPLICATION

This application claims priority to German Patent Application No. DE 102016118297.4, filed Sep. 28, 2016, the entire disclosure of which is hereby incorporated herein by reference.

TECHNICAL FIELD

The invention generally relates to a method and a system for controlling an agricultural vehicle, and more specifically to a method and system for determining an operating point for the agricultural vehicle.

BACKGROUND

Agricultural vehicles, such as tractors, are frequently used for soil preparation activities, in which high tractive power is used (e.g., when plowing). Power losses may occur during these strenuous soil preparation activities due to one or more reasons, such as slippage between the ground and the ground engaging device of the vehicle (e.g., any type of ground engaging means of the vehicle), and such as the rolling resistance of the ground engaging device. Examples of the ground engaging devices may include, but are not limited to, tires (such as pneumatic tires) and/or crawler tracks. These power losses can be influenced by varying a contact zone of the ground engaging device, wherein this can be achieved, for example, by changing the tire pressure and/or by adapting the ballasting of the agricultural vehicle. However, the adjustment of a suitable tire pressure and the selection of a corresponding vehicle ballasting are relatively complicated, even for an experienced operator. In this respect, it is frequently attempted to reduce the slippage between the ground and the ground engaging device of the vehicle in order to thereby reduce the power loss and to increase a so-called traction efficiency.

In order to assist the operator in selecting the corresponding ballasting, WO 2016/045868 A1 discloses a method and a system for selecting and displaying one of several ballasting options when an implement is mounted on the agricultural vehicle. In this case, the type of mounted implement defines operating ranges of up to three operating parameters such as, for example, the operating speed, the load of the mounted implement, or the propulsion engine power of the vehicle. An option is selected, among other things, dependent on a prevalence or probability of occurrence such that, for example, ballasting options close to threshold values are negligible. In this case, the tire pressure can be controlled dependent on the selected ballasting option.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

As discussed above, WO 2016/045868 A1 teaches selecting an option depending on a prevalence or probability of occurrence such that ballasting options close to threshold values are negligible. In that regard, the tire pressure is controlled dependent on the selected ballasting option. However, it is disadvantageous that the stored ballasting options are respectively selected dependent on the mounted implement and merely based, among other things, on assumed average slippage values and rolling resistance values.

In one implementation, a method and a system is disclosed for determining an operating point of an agricultural vehicle in which power losses may be reduced.

Specifically, a method and a system are disclosed for determining an operating point of an agricultural vehicle with the ground engaging device for supporting the vehicle on the ground, a propulsion engine for driving the ground engaging device, sensors for generating sensor signals, wherein a sensor signal can be generated as function of a measured vehicle parameter, and an evaluation unit for carrying out the method and for acquiring and evaluating at least sensor signals. In one implementation, at least one input parameter, which is relevant to operation (e.g., such as indicative of traction between the ground and the ground engaging device) is entered into the evaluation unit, that at least one characteristic diagram for operating parameters of the vehicle is prepared by the evaluation unit based on the at least one input parameter, that an optimal operating point for the vehicle is determined based on the characteristic diagram and/or retrieved from a storage unit based on a position of the vehicle, that a current operating point is determined by the evaluation unit based on acquired vehicle parameters, and that the current operating point is compared with an optimal operating point. The determination of the actual operating point and its comparison with an optimal operating point, which can be generated, in particular, from a characteristic diagram adapted to the actual operating conditions, enables the operator to adapt the actual operating point to the optimal operating point for the actual ground conditions and/or harvesting conditions. In this way, power losses, such as due to slippage and/or rolling resistance, are reduced by considering the actual working conditions. In this way, the efficiency of the agricultural vehicle may be increased.

In one implementation, the system (such as the evaluation unit) may analyze the operating parameters and/or vehicle parameters (e.g., compare the operating parameters and/or vehicle parameters with one or more aspects of the optimal operating point). Based on the analysis, the system (such as the evaluation unit) may determine changes to the operating parameters and/or vehicle parameters in order to reach (or come closer to) the optimal operating point. The system, such as the evaluation unit, may then display at least one aspect of the operating parameters and/or vehicle parameters (e.g., the current operating parameters and/or vehicle parameters and/or the recommended changes to the operating parameters and/or vehicle parameters) and/or at least partially automatically control (e.g., control one aspect of the operating parameters and/or vehicle parameters or fully control all aspects of the operating parameters and/or vehicle parameters) based on the analysis (e.g., based on the comparison). In this case, the operating point may be optimized continuously and/or automatically, such as by adjusting the operating parameters and/or vehicle parameters (e.g., by generating one or more adjusted parameters, such as adjusted operating parameters and/or adjusted vehicle parameters). In this way, power losses due to slippage and/or rolling resistance may be additionally reduced with consideration of the actual working conditions such that the efficiency of the agricultural vehicle may be additionally increased.

The characteristic diagram may be prepared based on the input parameters and based on a stored characteristic diagram (e.g., by retrieving a stored characteristic diagram and/or adapting a retrieved stored characteristic diagram). The determination of an optimal operating point can be accelerated by retrieving a stored characteristic diagram that matches the entered input parameters. The effort to prepare the characteristic diagram may likewise be reduced by adapting an already existing stored characteristic diagram to the entered input parameters and therefore to the actual operating conditions. For example, the evaluation unit may access a characteristic diagram stored in memory, and amend at least part of the accessed characteristic diagram based on the entered input parameters.

In a particular implementation, the system generates and stores a characteristic diagram by continuously and/or discontinuously recording and storing actual operating points and/or operating parameters. In one implementation, the characteristic diagram is generated based on actually recorded operating points and/or operating parameters. In this implementation, the system may generate an improved characteristic diagram, particularly with consideration of the respective position data of the vehicle, with position-related and/or field-related data. In this way, the accuracy of the characteristic diagram and of the determined operating point may be improved.

In another specific implementation, the system determines an optimal operating point, such as from the characteristic diagram linked with position data (e.g., one or more previous positions) and stored in a retrievable fashion. In this way, the system may store optimal operating points for entered soil conditions and/or harvesting conditions in a position-related fashion (e.g., correlated to position) such that the system may perform a simplified comparison in order to implement the improved operation, particularly without generating a characteristic diagram.

In an implementation, the system generates and displays a graphic representation of the characteristic diagram, operating parameters and/or vehicle parameters. The display may comprise a current graphic representation and/or a previous graphic representation. In this case, the system may display the graphic representation in the form of diagrams and/or bar diagrams, such as based on the operating parameters. In this way, information on the characteristic diagram, e.g., the current and/or optimal operating point, may be visually displayed to the operator in an easily perceivable fashion. The system may likewise generate and graphically display suggested actions for reaching (or coming closer to) the optimal operating state.

In another implementation, the system controls and/or adjusts the displayed operating point, the operating parameters and/or the vehicle parameters by one or more inputs (e.g., the operator interacting with the respective graphic representation of the operating point and/or the respective parameter). This can be realized, for example, by the operator interacting with an input device (e.g., a touchscreen monitor) on the agricultural vehicle (e.g., the operator's input on the touchscreen is an example of an indication of interaction by the operator). In this case, the operator may adapt the displayed operating point, the operating parameters and/or the vehicle parameters in an easily manageable fashion such that the workload of the operator can be reduced.

In one implementation, the method and system may reduce the effect of soil compaction risk based on analysis of the input parameters and/or the operating parameters. In this way, the system may generate in a timely fashion a warning, such as an excessive soil compaction warning, for the operator such that excessive soil compaction. In particular, the system may determine a soil compaction risk based on one or both of the at least one input parameter or the one or more operating parameters, and determine whether the soil compaction risk is greater than a predetermined amount. If the system determines that the soil compaction risk is greater than the predetermined amount, the warning is issued. The warning may take one of several forms, including displaying potential varied operating parameters and/or vehicle parameters (in order for the operator to select) and/or displaying varied operating parameters and/or vehicle parameters (e.g., automatically implemented varied operating parameters and/or vehicle parameters).

Examples of operating parameters include, but are not limited to one, some, any combination, or all of the following: a traction coefficient; a traction efficiency; a coefficient of rolling resistance; or a slippage. Vehicle parameters may be based on one or more sensor readings or sensor data. Examples of vehicle parameters include, but are not limited to one, some, any combination, or all of the following: a tire pressure; a wheel speed, tractive power; a wheel speed; an axle load; torque; or an engine speed.

In one implementation, a system is disclosed for determining an operating point for an agricultural vehicle with ground engaging device for supporting the vehicle on the ground, a propulsion engine for driving the ground engaging device, sensors for generating sensor signals, wherein a sensor signal can be generated as function of a measured vehicle parameter, and an evaluation unit for carrying out the method and for acquiring and evaluating at least sensor signals. In one implementation, at least one input parameter, which is relevant particularly to traction between the ground and the ground engaging device, may be entered into the evaluation unit, at least one characteristic diagram for operating parameters of the vehicle may be prepared by the evaluation unit based on the at least one input parameter, an optimal operating point for the vehicle may be determined based on the characteristic diagram and/or retrieved from a storage unit based on a position of the vehicle (e.g., a current location of the vehicle), a current operating point may be determined by the evaluation unit based on acquired vehicle parameters, particularly sensor data, and the current operating point may be compared with the optimal operating point. The system's determination of the actual operating point and its comparison with an optimal operating point, which can be generated in one implementation from a characteristic diagram adapted to the actual operating conditions, enables the operator to adapt the actual operating point to the optimal operating point for the actual soil conditions and/or harvesting conditions. In this way, power losses, for example, due to slippage and/or rolling resistance may be reduced by considering the actual working conditions. Further, because power losses are reduced, the efficiency of the agricultural vehicle may be increased in turn.

In one implementation, the system (such as the evaluation unit) determines changes of the operating parameters and/or vehicle parameters for reaching (or coming closer to) the optimal operating point, displays and/or at least partially automatically controls based on the comparison. In this case, the operating point may be optimized continuously and/or automatically, such as by adjusting the operating parameters and/or vehicle parameters. In this way, power losses due to slippage and/or rolling resistance may be reduced by considering the actual working conditions such that the efficiency of the agricultural vehicle may be increased.

Further, the system described above may be incorporated in (or in some way associated with) an agricultural vehicle and may determine an operating point, particularly in accordance with an above-described method. In particular, the system and method may be used to control operation of the vehicle, such as the agricultural vehicle can be ballasted, an engine speed may be adjusted and/or the pressure in at least one ground engaging device may be adjusted.

Figure 1:
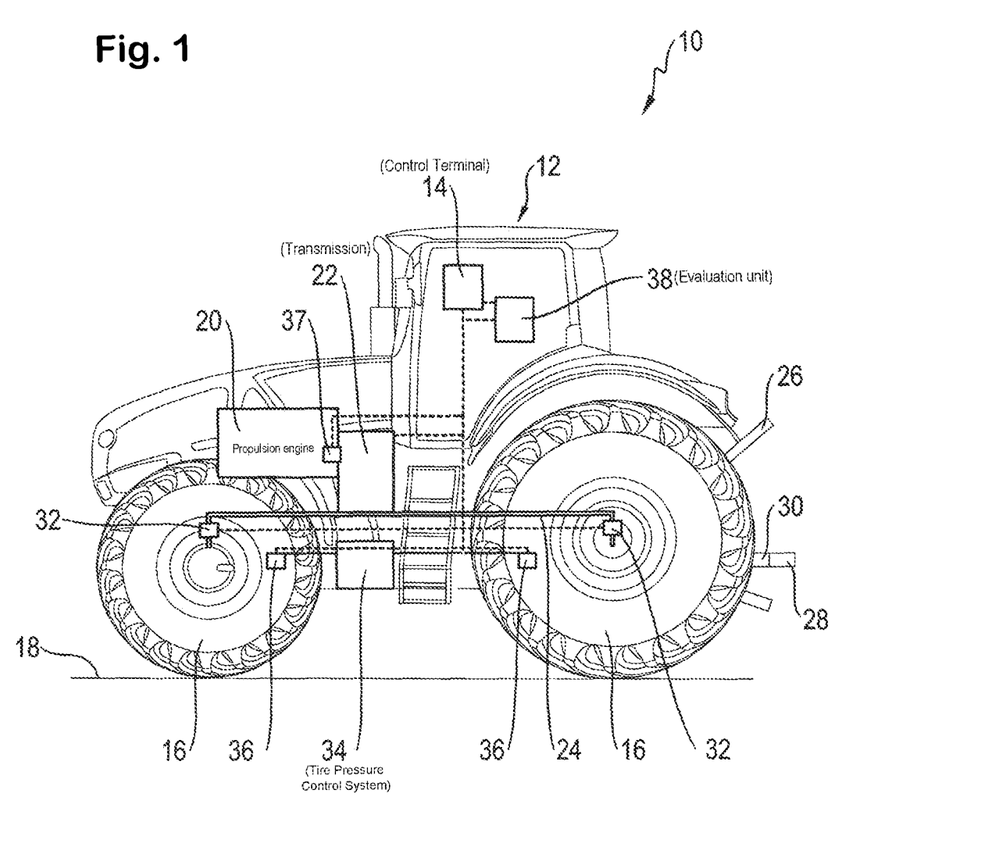
FIG. 1 shows a schematic side view of an agricultural vehicle.

Referring to the figures, FIG. 1 shows a schematic side view of an agricultural vehicle 10 in the form of a tractor, wherein it is assumed that a person skilled in the art is familiar with the basic design of a tractor. Agricultural vehicle 10 may comprise any vehicle suitable for agricultural work, such as a tractor, a telescopic loader, a construction machine or a self-propelled harvester. In this regard, agricultural vehicles 10, other than those specific examples, are contemplated. The agricultural vehicle 10 features a closed driver's cabin 12 for accommodating an operator, wherein a control terminal 14 for operating the agricultural vehicle 10 is arranged within the driver's cabin 12. The agricultural vehicle 10 features one or more ground engaging device 16, such as in the form of pneumatic tires, which are arranged on a front axle and a rear axle and engaged with the soil 18 in order to transmit motive forces. The ground engaging device 16 are driven by a propulsion engine 20, which is realized in the form of an internal combustion engine with a speed sensor 37, as well as a transmission 22 that cooperates with the propulsion engine. In this case, the transmission 22 may be realized, for example, in the form of a hydromechanical power-branched transmission that features hydrostats in the hydraulic power branch. An output torque of the transmission 22 is transmitted to the ground engaging device 16 by means of a schematically illustrated drive train 24, wherein the agricultural vehicle 10 shown is a four-wheel drive vehicle.

The agricultural vehicle 10 features different couplings for towing implements to perform various operations. For example, the agricultural vehicle 10 on its tail end may include agricultural implements (not shown), such as for example a plow or a baling press. The tractor shown features a rear power lift 26, as well as an adjustable drawbar 28. For example, an implement coupled to the adjustable drawbar 28 produces a tractive load that essentially acts on the adjustable drawbar 28 horizontally and can be measured by means of a tractive load sensor 30. Wheel sensors 32 assigned to the respective ground engaging device 16 make it possible, for example, to measure one or more aspects associated with the vehicle, such as respectively measure a speed, a wheel force, a wheel torque and/or an axle load acting upon the respective ground engaging device 16. The agricultural vehicle 10 furthermore features a tire pressure control system 34, through which the respective pressure $P_{A,B}$ acting in a ground engaging device 16 can be adjusted. The pressure $P_{A,B}$ acting in a ground engaging device 16 may be respectively measured using a pressure sensor 36. The sensor signals generated by the sensors 30, 32, 36, 37 may be input to or acquired by an evaluation unit 38 and processed into one or more vehicle parameters, such as a pressure $P_{A,B}$ in the ground engaging device 16, a wheel speed, a tractive power, a wheel force, an axle load, a wheel torque and/or an engine speed.

The agricultural vehicle 10 may comprise one or more analytical and/or processing functions, an example of which is evaluation unit 38 which includes one or more analytical and/or processing functions described herein. FIG. 1 represents the analytical and/or processing functions as evaluation unit 38. This representation is merely for illustration purposes.

Figure 2:
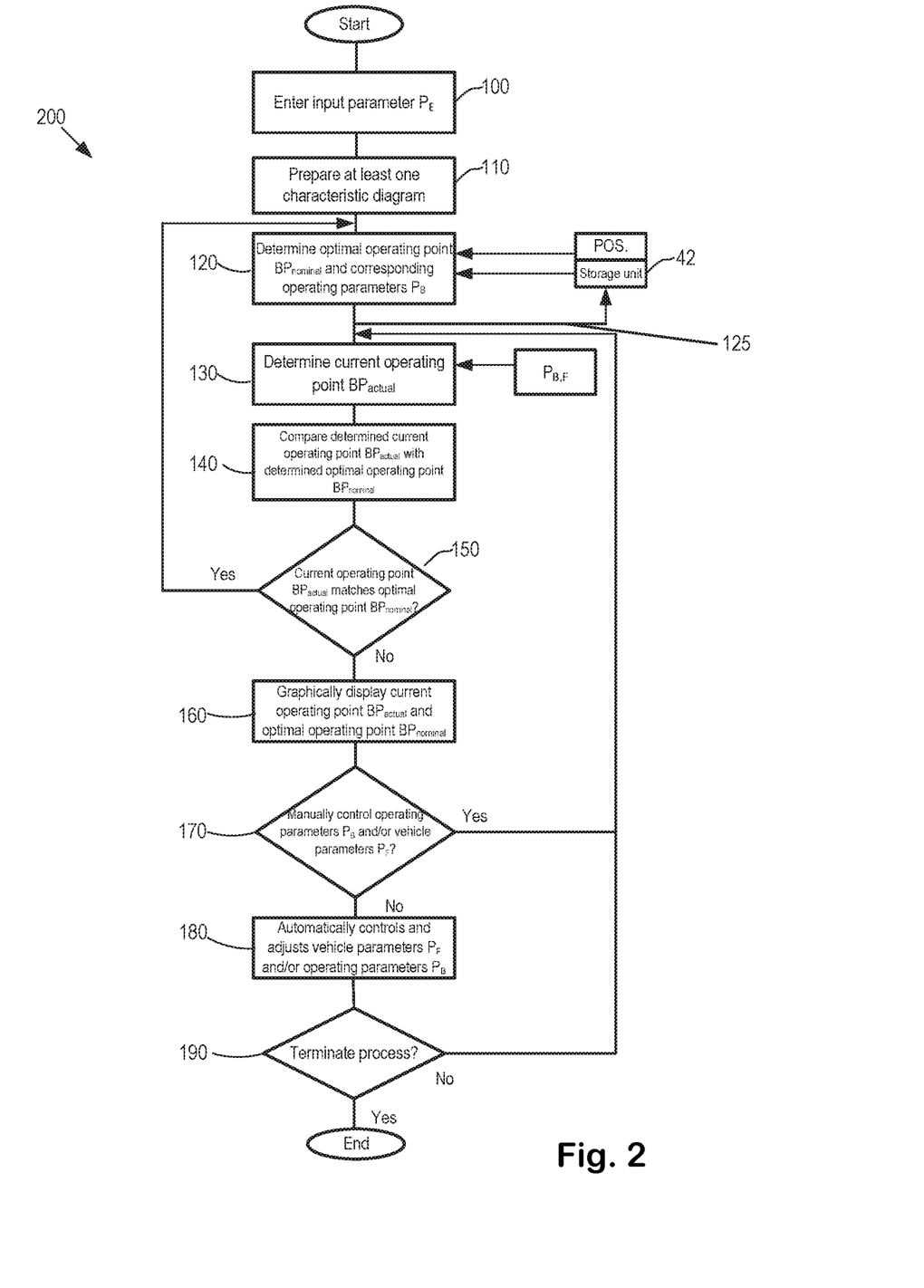
FIG. 2 shows a flowchart of a method for determining and adjusting an operating point of the agricultural vehicle.

The evaluation unit 38 may be designed as a computer or other type of computing functionality. In this regard, the evaluation unit 38 may take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. In particular, the evaluation unit 38 may comprise logic, such as computable executable instructions, which enable the analysis, the generation of displays, the control such as disclosed herein (e.g., such as depicted in FIG. 2). The evaluation unit 38 can be configured with hardware and/or firmware to perform the various functions described below and shown in the flow diagram of FIG. 2. Also, some of the components shown as being external to the evaluation unit 38 can also be internal to the evaluation unit 38 (e.g., storage unit 42 may be encompassed within the evaluation unit 38), and other components can be used. As such, the evaluation unit 38 may comprise processor(s) in communication with one or more memories (such as storage unit 42), with data and/or the data structures used in the evaluation unit 38 analytics, discussed further below.

According to one implementation, at least one input parameter $P_E$ can be entered into the evaluation unit 38. Inputting the parameter $P_E$ may be achieved in one of several ways. For example, inputting may be realized, for example, with the aid of the control terminal 14 that is connected to the evaluation unit 38. In this case, the input parameter $P_E$ may comprise any one, any combination, or all of: a soil type; a soil moisture; a vegetation state; a vegetation status; a soil density; a current pressure $P_{A,B}$; or a type of ground engaging device. In this way, the operator can initiate a method for determining and, in particular, adjusting an operating point $BP_{actual,nominal}$ for the agricultural vehicle 10.

A flowchart of this method is illustrated in FIG. 2. At 100, the input parameter $P_E$ is entered, for example, by the operator. Thus, in one implementation, the operator may enter one or more properties of the soil 18 into the evaluation unit 38. These input parameters $P_E$ may serve as the basis for preparing at least one characteristic diagram 40, 47 at 110 of the method. The characteristic diagram 40, 47 is a graphic representation of operating parameters $P_B$ such as, for example, any one, any combination, or all of the following: a traction efficiency η; a traction coefficient κ; a coefficient of rolling resistance ζ; or a slippage σ. At 120, the system determines an optimal operating point $BP_{nominal}$, which corresponds, for example, to a maximum within the characteristic diagram 40, 47, based on the characteristic diagram 40, 47 and the system determines the corresponding operating parameters $P_B$ therefrom. 120 may be based on inputs from a current position POS of the agricultural vehicle 10 and/or based on storage unit 42.

In this way, the optimal slippage σ for given input parameters $P_E$ such as the current soil condition can thereby be determined for a certain input parameter $P_E$ and a corresponding characteristic diagram 40, 47 that represents, for example, a slippage σ as a function of a traction efficiency η. It is likewise possible to retrieve an optimal operating point $BP_{nominal}$ from a storage unit 42 based on a position of the agricultural vehicle 10. Older optimal operating points $BP_{nominal}$ for the entered input parameters $P_E$ and the current position of the vehicle 10, which were already stored in a retrievable fashion, particularly may be used for this purpose. Agricultural vehicle 10 may store optimal operating points $BP_{nominal}$ determined from the characteristic diagram in the storage unit 42, particularly in conjunction with current position data (e.g., the optimal operating points $BP_{nominal}$ may be correlated to the current position data). This is illustrated in FIG. 2 by arrow 125. At 130, the evaluation unit 38 determines the current operating point $BP_{actual}$ based on the currently acquired vehicle parameters (shown as $P_{B,F}$). The determined current operating point $BP_{actual}$ can likewise be stored in the storage unit 42 in conjunction with position data (e.g., the determined current operating point $BP_{actual}$ may be correlated to the position data) and, in particular, associated weather data that may influence the soil condition. At 140, the evaluation unit 38 then compares the determined current operating point $BP_{actual}$ with the determined optimal operating point $BP_{nominal}$. At 150, it is determined whether the current operating point $BP_{actual}$ matches the optimal operating point $BP_{nominal}$. If the current operating point BPactual matches the optimal operating point BPnominal, flow diagram 200 loops back to 120 so that the optimal operating point $BP_{nominal}$ is determined anew. This may take place, for example, with consideration of a changed position and/or changing weather data. An adjustable deviation, which can still be considered as a match, may be permitted in the comparison of the current operating point $BP_{actual}$ with the optimal operating point $BP_{nominal}$.

If the current operating point $BP_{actual}$ deviates from the optimal operating point $BP_{nominal}$, the current operating point $BP_{actual}$ and the optimal operating point $BP_{nominal}$ are after the first decision step at 150 graphically displayed at 160. It is likewise possible to display the characteristic diagram, as well as the operating parameters $P_B$ and/or vehicle parameters $P_F$. At 170, it is determined whether the operating parameters $P_B$ and/or vehicle parameters $P_F$ are to be controlled manually. If the operating parameters $P_B$ and/or vehicle parameters $P_F$ are to be controlled manually, the operator may adjust the corresponding parameters $P_{B,F}$, wherein the method loops back to 130 after an adjustment by the operator.

If the corresponding parameters are not to be manually controlled by the operator, at 180, evaluation unit automatically controls and adjusts the vehicle parameters $P_F$ and/or operating parameters $P_B$ in order to reach the optimal operating point $BP_{nominal}$. At 190, the system determines whether or not the method should be terminated, for example, in case processing of a field is completed. This may be realized with a corresponding user entry, for example, on the control terminal 14 or automatically based on a vehicle position. If no at 190, flow chart loops back to 130, in which the current operating point $BP_{actual}$ is determined anew based on the changed vehicle parameters $P_F$ and/or operating parameters $P_B$.

Figure 3A:
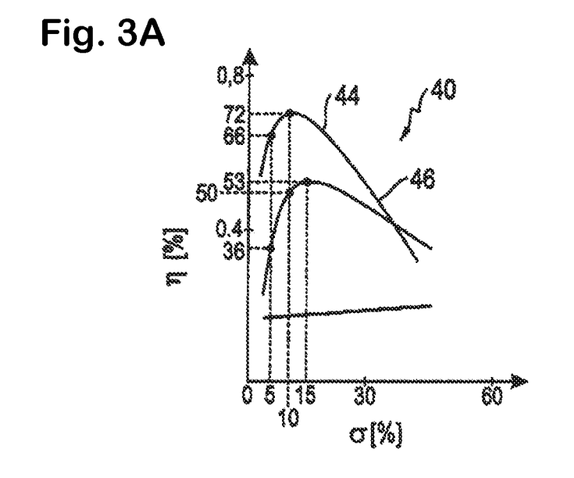
FIG. 3*a* shows a first determined characteristic diagram.
Figure 3B:
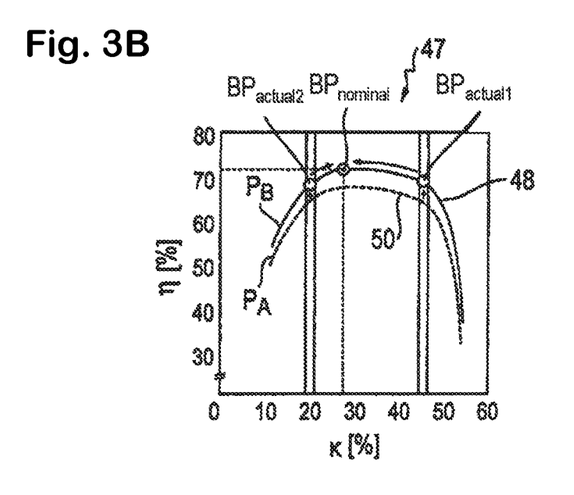
FIG. 3*b* shows a second determined characteristic diagram.

FIG. 3a shows an example of two overlapping characteristics 44, 46 in a first characteristic diagram 40, in which the traction efficiency η is illustrated as a function of the slippage σ. In this case, the first characteristic 44 has a maximum traction efficiency η at a slippage σ of approximately 10%. The second characteristic 46, in contrast, is realized in such a way that a maximum traction efficiency η is reached at a slippage of 15%. Based on these two characteristics 44, 46, it is evident that a maximum traction efficiency η can be reached at a different slippage σ in different soil conditions, which then also correspond to different input parameters $P_E$, wherein a low slippage σ does not necessarily always correspond to the highest traction efficiency η. FIG. 3b shows a second characteristic diagram 47, in which the traction efficiency η is illustrated as a function of the traction coefficient κ. In this case, the traction coefficient κ is essentially dependent on the ballasting of the vehicle 10 and/or the tractive load. An optimal operating point $BP_{nominal}$, which lies on the third characteristic 48, is illustrated in the second characteristic diagram 47. The optimal operating point $BP_{nominal}$ approximately corresponds to a traction efficiency η of 72% and a traction coefficient κ of approximately 28%. In addition, a first current operating point $BP_{actual,1}$ and a second current operating point $BP_{actual,2}$ are illustrated on the third characteristic 48. In this case, the first current operating point $BP_{actual,1}$ corresponds to a traction coefficient κ of approximately 45% and would represent insufficient ballasting of the agricultural vehicle 10. The second current operating point $BP_{actual,2}$ corresponds to a traction coefficient κ of approximately 20% and would represent excessive ballasting of the agricultural vehicle 10. The third characteristic 48 corresponds to a pressure $P_B$ in the ground engaging device 16. The fourth characteristic 50, which is illustrated underneath the third characteristic 48, corresponds to a tire pressure $P_A$ in the ground engaging device 16 that may be higher than the tire pressure $P_B$. This clearly shows that the tire pressure should be reduced from $P_A$ to $P_B$ in order to reach the optimal operating point $BP_{nominal}$ by varying the current operating point $BP_{actual}$. A shift of the first and/or second current operating point $BP_{actual,1, 2}$ along the third characteristic 48 necessitates a change of the ballasting on the vehicle 10. The necessitated ballasting change may be graphically displayed to the operator, for example, in the form of operating parameters $P_B$ or vehicle parameters $P_F$, wherein an optimal range can respectively be graphically highlighted.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

REFERENCE LIST

10 Agricultural vehicle
12 Driver's cabin
14 Control terminal
16 Ground engaging device
18 Soil
20 Propulsion engine
22 Transmission
24 Drive train
26 Rear power lift
28 Adjustable drawbar
30 Tractive load sensor
32 Wheel sensor
34 Tire pressure control system 36 Pressure sensor
37 Speed sensor
38 Evaluation unit
40 First characteristic diagram
42 Storage unit
44 First characteristic
46 Second characteristic
47 Second characteristic diagram
48 Third characteristic
50 Fourth characteristic
$BP_{actual}$ Current operating point
$BP_{nominal}$ Optimal operating point
$P_E$ Input parameter
$P_B$ Operating parameter
$P_F$ Vehicle parameter
$P_{A,B}$ Pressure
$\eta$ Traction efficiency
$\kappa$ Traction coefficient
$\zeta$ Coefficient of rolling resistance
$\sigma$ Slippage

The invention claimed is:

1. A method for determining an operating point of an agricultural vehicle, the agricultural vehicle including a ground engaging device configured to support the agricultural vehicle on a ground, a propulsion engine configured to drive the ground engaging device, the method comprising:
accessing at least one input parameter, the at least one input parameter indicative of traction between the ground and the ground engaging device;
accessing, based on the at least one input parameter, a characteristic diagram, the characteristic diagram indicative of one or more operating parameters of the agricultural vehicle;
determining, based on the accessed characteristic diagram, an optimal operating point for the agricultural vehicle;
accessing one or more vehicle parameters;
determining, based on the one or more vehicle parameters, a current operating point of the agricultural vehicle;
comparing the current operating point with the optimal operating point;
generating a graphic representation of the characteristic diagram identifying the optimal operating point and the current operating point, and at least one adjusted vehicle parameter or at least one adjusted operating parameter;
outputting the graphic representation on a display;
receiving at least one input from an operator, the input comprising at least one of an interaction with the graphic representation or an input indicative of selection of the at least one adjusted vehicle parameter or the at least one adjusted operating parameter; and
controlling the agricultural vehicle based on the comparison and the received input.

2. The method of claim 1, wherein generating the graphic representation comprises:
determining, based on the comparison of the current operating point with the optimal operating point, the at least one adjusted vehicle parameter or the at least one adjusted operating parameter in order for the agricultural vehicle to change the current operating point of the agricultural vehicle to be closer to the optimal operating point of the vehicle.

3. The method of claim 2, further comprising:
determining a soil compaction risk based on one or both of the at least one input parameter or the one or more operating parameters; and
determining whether the soil compaction risk is greater than a predetermined amount; and
wherein, responsive to determining that the soil compaction risk is greater than a predetermined amount, including an excessive soil compaction warning in the graphic representation to the operator.

4. The method of claim 1, further comprising automatically controlling the agricultural vehicle based on the comparison by:
determining, based on the comparison of the current operating point with the optimal operating point, at least one adjusted parameter in order for the agricultural vehicle to change the current operating point of the agricultural vehicle to be closer to the optimal operating point of the vehicle, the at least one adjusted parameter comprising one or both of the operating parameters or the vehicle parameters; and
automatically controlling, based on the at least one adjusted parameter, the agricultural vehicle.

5. The method of claim 1, wherein accessing the characteristic diagram comprises:
retrieving, from a memory and based on the at least one input parameter, a stored characteristic diagram to be the characteristic diagram.

6. The method of claim 5, further comprising accessing a current position of the agricultural vehicle;
wherein the characteristic diagram correlates the optimal operating point to previous positions of the agricultural vehicle; and
wherein the optimal operating point is retrieved from the characteristic diagram based on the current position of the vehicle.

7. The method of claim 1, wherein the operating parameter comprises a traction efficiency ($\eta$), a coefficient of rolling resistance ($\zeta$), a traction coefficient ($\kappa$), or a slippage ($\sigma$).

8. The method of claim 1, wherein the vehicle parameter comprises a tire pressure, a wheel speed, a tractive power, a wheel force, an axle load, a wheel torque or an engine speed; and
wherein one or more sensors are configured to generate one or more sensor signals;
wherein an evaluation unit is configured to acquire and evaluate the one or more sensor signals; and
wherein the one or more sensor signals are generated as a function of the one or more vehicle parameters.

9. The method of claim 1,
wherein the characteristic diagram comprises:
a first characteristic indicative of the optimal operating point at current vehicle parameters and the current operating point; and
a second characteristic indicative of an alternate optimal operating point at at least one vehicle parameter different from the current vehicle parameters along with a display of the at least one vehicle parameter different from the current vehicle parameters; and
wherein the at least one input from the operator is indicative of the operator selecting the at least one vehicle parameter different from the current vehicle parameters.

10. The method of claim 9, wherein the first characteristic comprises a first characteristic curve; and wherein the second characteristic comprises a second characteristic curve different from the first characteristic curve.

11. The method of claim 1, wherein the characteristic diagram comprises a characteristic curve with the optimal operating point and the current operating point indicated on the characteristic curve.

12. The method of claim 11, wherein the graphic representation includes:
an indication of a shift along the characteristic curve from the current operating point to the optimal operating point; and
at least one changed operating parameter or at least one changed vehicle parameters to effect the shift along the characteristic curve.

13. A method for determining an operating point of an agricultural vehicle, the agricultural vehicle including a ground engaging device configured to support the agricultural vehicle on a ground, a propulsion engine configured to drive the ground engaging device, the method comprising:
determining an optimal operating point for the agricultural vehicle based on:
(1) a characteristic diagram, the characteristic diagram indicative of one or more operating parameters of the agricultural vehicle and selected based on at least one input parameter, the at least one input parameter indicative of traction between the ground and the ground engaging device; or
(2) a current position of the agricultural vehicle;
accessing one or more vehicle parameters;
determining, based on the one or more vehicle parameters, a current operating point of the agricultural vehicle;
comparing the current operating point with the optimal operating point;
generating a graphic representation of the characteristic diagram identifying the optimal operating point and the current operating point, and at least one adjusted vehicle parameter or at least one adjusted operating parameter;
outputting the graphic representation on a display;
receiving at least one input from an operator, the input comprising at least one of an interaction with the graphic representation or an input indicative of selection of the at least one adjusted vehicle parameter or the at least one adjusted operating parameter; and
controlling the agricultural vehicle based on the comparison and the received input.

14. The method of claim 13,
wherein the characteristic diagram comprises:
a first characteristic indicative of the optimal operating point at current vehicle parameters and the current operating point; and
a second characteristic indicative of an alternate optimal operating point at at least one vehicle parameter different from the current vehicle parameters along with a display of the at least one vehicle parameter different from the current vehicle parameters; and
wherein the at least one input from the operator is indicative of the operator selecting the at least one vehicle parameter different from the current vehicle parameters.

15. An agricultural vehicle comprising:
a ground engaging device configured to support the agricultural vehicle on a ground;
a propulsion engine configured to drive the ground engaging device;
one or more sensors configured to generate sensor signals; and
an evaluation unit in communication with the ground engaging device and the one or more sensors, the evaluation unit comprising a processor and configured to:
access at least one input parameter, the at least one input parameter indicative of traction between the ground and the ground engaging device;
access, from a memory based on the at least one input parameter, a characteristic diagram, the characteristic diagram indicative of one or more operating parameters of the agricultural vehicle;
determine, based on the accessed characteristic diagram, an optimal operating point for the agricultural vehicle;
access one or more vehicle parameters,
determine, based on the one or more vehicle parameters, a current operating point of the agricultural vehicle,
compare the current operating point with the optimal operating point;
generate a graphic representation of the characteristic diagram identifying the optimal operating point and the current operating point, and at least one adjusted vehicle parameter or at least one adjusted operating parameter;
output the graphic representation on a display;
receive at least one input from an operator, the input comprising at least one of an interaction with the graphic representation or an input indicative of selection of the at least one adjusted vehicle parameter or the at least one adjusted operating parameter; and
control the agricultural vehicle based on the comparison and the received input.

16. The agricultural vehicle of claim 15, further comprising a display; and
wherein the evaluation unit is configured to control the agricultural vehicle based on the comparison by:
determining, based on the comparison of the current operating point with the optimal operating point, at least one adjusted parameter in order for the agricultural vehicle to change an actual operating point of the agricultural vehicle to be closer to the optimal operating point of the vehicle, the at least one adjusted parameter comprising one or both of the operating parameters or the vehicle parameters;
generating an output that includes the at least one adjusted parameter for output to an operator;
outputting, via the display, the output to the operator;
receiving input from the operator responsive to outputting the output to the operator; and
controlling, based on the input from the operator, the agricultural vehicle.

17. The agricultural vehicle of claim 15, wherein the evaluation unit is configured to control the agricultural vehicle based on the comparison by:
determining, based on the comparison of the current operating point with the optimal operating point, at least one adjusted parameter in order for the agricultural vehicle to change an actual operating point of the agricultural vehicle to be closer to the optimal operating point of the vehicle, the at least one adjusted parameter comprising one or both of the operating parameters or the vehicle parameters; and
automatically controlling, based on the at least one adjusted parameter, the agricultural vehicle.

18. The agricultural vehicle of claim 15, wherein agricultural vehicle is configured to be ballasted;
  wherein the propulsion engine is configured to operate at an engine speed;
  wherein the ground engaging device includes pressure against the ground; and
  wherein the evaluation unit is configured to control the agricultural vehicle based on the comparison by adjusting ballasting, adjusting the engine speed of the propulsion engine, or adjusting the pressure of the ground engaging device.

19. The agricultural vehicle of claim 15,
  wherein the characteristic diagram comprises:
    a first characteristic indicative of the optimal operating point at current vehicle parameters and the current operating point; and
    a second characteristic indicative of an alternate optimal operating point at at least one vehicle parameter different from the current vehicle parameters along with a display of the at least one vehicle parameter different from the current vehicle parameters; and
  wherein the at least one input received from the operator is indicative of the operator selecting the at least one vehicle parameter different from the current vehicle parameters.

20. The agricultural vehicle of claim 15, wherein the characteristic diagram comprises a characteristic curve with the optimal operating point and the current operating point indicated on the characteristic curve.

21. The agricultural vehicle of claim 20, wherein the graphic representation includes:
  an indication of a shift along the characteristic curve from the current operating point to the optimal operating point; and
  at least one changed operating parameter or at least one changed vehicle parameters to effect the shift along the characteristic curve.

* * * * *